United States Patent [19]

Ebert

[11] 4,189,860

[45] Feb. 26, 1980

[54] BAIT CARRIER AND DRIVER

[76] Inventor: Edward A. Ebert, 203 Huxley Dr., Snyder, N.Y. 14226

[21] Appl. No.: 903,663

[22] Filed: May 8, 1978

[51] Int. Cl.² .............................................. A01K 85/00
[52] U.S. Cl. ................... 43/42.29; 43/42.48; 43/44.4
[58] Field of Search ............ 43/41, 42.29, 42.35, 43/42.48, 43.15, 44.2, 44.4

[56] References Cited
U.S. PATENT DOCUMENTS

| 2,461,755 | 2/1949 | Miller | 43/42.48 X |
|---|---|---|---|
| 2,518,593 | 8/1950 | Bell | 43/44.2 |
| 2,582,646 | 1/1952 | Moore | 43/41 |
| 2,931,123 | 4/1960 | Jensen | 43/42.29 X |
| 3,457,666 | 7/1969 | Klinkhamer | 43/41 |
| 3,645,031 | 2/1972 | Egles | 43/44.2 |

FOREIGN PATENT DOCUMENTS 481784  11/1948  Canada ..................... 43/42.35

*Primary Examiner*—Nicholas P. Godici

[57] ABSTRACT

A carrier and motivator of passive fishing baits, having a convenient attachment means and attached or remote fish hooking means.

7 Claims, 9 Drawing Figures

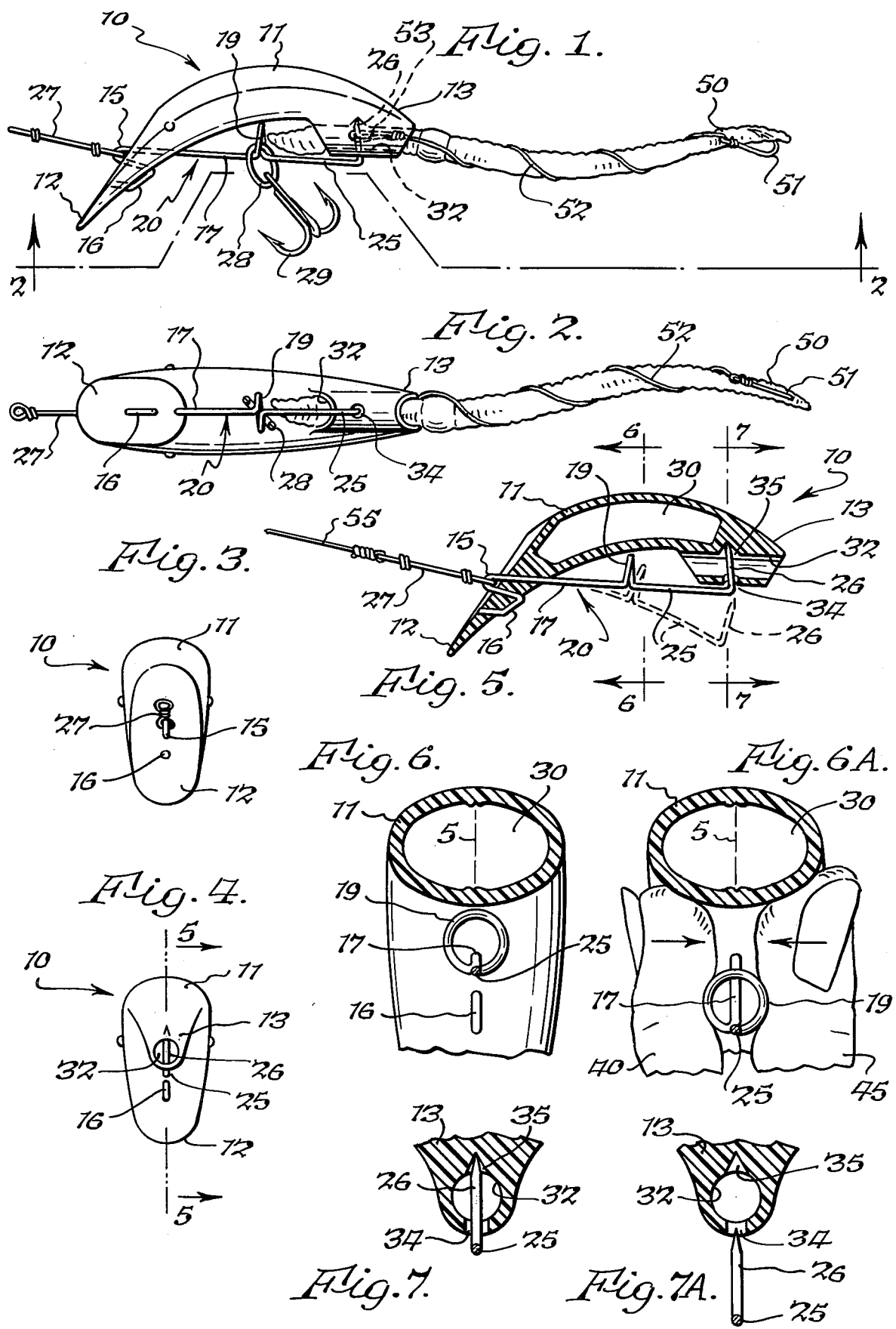

BAIT CARRIER AND DRIVER

BACKGROUND OF THE INVENTION

This invention relates to the presentation of a bait in the sport of fishing and more particularly to the provision of a carrier having a cavity or holder for that bait, which is motorized to give the bait an active alluring action while at the same time give it floating or sinking characteristics.

In prior art, cavities in artificial lures have been used, but not so far as is known for the purpose of inserting and holding a passive lure to provide it with motion. A patent to Kasmeyer, U.S. Pat. No. 2,538,459, filed Apr. 21, 1950 provides a longitudinal tube through a lure to cause it to move in a zig zag fashion, while a patent to Spugios, U.S. Pat. No. 2,865,129 is provided to take air into a passageway and discharge a trail of bubbles in its wake.

In fishing, for example, a bait such as a live night crawler would have a live natural action while crawling or swimming as long as it was alive, but when dead it would not. Neither would bait such as pork rind or belly strip baits. All of these though do have some undulatory action when drawn through the water. It is to enhance and increase this motion that the instant invention is occupied with.

While some of these baits float and others sink, fishing sometimes requires that they be presented at a certain level. This invention can provide either a floating or sinking, or a controlled constant level presentation of the bait it carries by the choice of the proper carrier, sinker, or floater, and be assured of lively action to the bait.

Commonly baits such as worms or pork rinds have been impaled promiscuously onto the hooks of all kinds of artificial lures. The thinking being that the added bait gives some naturalness to the artificiality. However, this mixture is more times than not an incompatible partnership. The artificial lure is doing one thing while the bait is fighting this action because it is not in synchronism with the pendulum action of the lure, i.e. working against the means that gives it action. Also those impaled baits tangle with other hooks to fragment and tear themselves to shreds. Further these attached baits all trail beyond the hooks, to thereby miss the short striking fish.

One general object of this invention is to provide a motorized, activated carrier for a line, dead, passive or artificial bait to give the bait an action and movement that belies the fact that it is inactive or imobile.

Another object of the invention is to provide a convenient and simple means of attachment of the bait to the carrier.

A further object is to provide this same attachment means with a trailing hooking means at the terminal end of the bait for short striking fish.

An object of the invention is also to provide either a buoyancy or sinking quality to the combined carrier and bait.

A still further object is to provide a streamlined combination of a carrier activator with a bait to improve on the hydrodynamics involved.

Another object of this invention is to provide a device which blends with the bait in continuity to look like a normal part or head end of that bait.

SUMMARY

This invention relates to a device connected between a fishermans fishing line and a relatively passive bait to give that bait lift or weight and to activate its movement to simulate animation and provide more effective hooking ability.

BRIEF DESCRIPTION OF THE DRAWINGS

The present invention, as well as further objects and features thereof, will be understood more clearly and fully from the following detailed description of the preferred embodiment, when read in conjunction with the accompanying drawings, in which:

FIG. 1 is a side elevation of a carrier trailing a night crawler;

FIG. 2 is a horizontal sectional view looking upwardly and taken along line 2—2 in FIG. 1.

FIG. 3 is a frontal view of FIG. 1 looking from left to right, with some parts not snown.

FIG. 4 is a rear view of FIG. 1 looking from right to left with some parts not shown.

FIG. 5 is a vertical longitudinal sectional view as if taken along a double dot dash line 5—5 of FIG. 4.

FIG. 6 is a cross section taken along line 6—6 of FIG. 5.

FIG. 7 is a cross section taken along line 7—7 of FIG. 5.

FIGS. 6A and 7A are cross sections similiar to FIGS. 6 and 7 but with the keeper parts in a retracted position.

DETAILED DESCRIPTION

In general the carrier 10 has a body portion 11, a driver lip portion 12 and a tail portion 13. The particular form shown in the drawings is of a so-called banana type plug lure but could be of other suitable forms.

The requisite among other things being that the carrier have floatation and the capability of motorized action when drawn through a body of water.

A pull eye 15 is formed at the fore end of a spring wire shank member 20. A "U" shaped bend 16 is included with the eye 15 for secure fastening in the body 11 of the carrier 10.

As will be seen in FIGS. 1 and 5 to the right hand of the eye 15 the wire member 20 continues in the form of a spring portion 17 and then on to convoluted finger piece 19 and farther to a terminal end 25 having a bent up keeper or spear 26. The shank wire 20 is firmly imbedded in the plastic body 11 at the left hand or front end as seen in FIGS. 1 and 5 but has the rest of its portions 17, 19, 25 and 26 free to move under bias of the spring portion 17.

At the left in FIGS. 1, 2 and 5 is a link 27 connected to the eye 15 to provide an articulate tie with a fishing line 55 for greatest action of the carrier 10.

Midway along the shank 20 at the finger piece a split ring 28 may be provided for attachment of a hook 29 which might or might not be used depending upon the use of the carrier and what other accessories might be used along with a bait 50.

The carrier 10 is provided with an air pocket 30 at approximately its middle and a tubular cavity 32 at its tail end portion 13. An opening 34 provides access for the spear 26 into and across the cavity 32 where the pointed tip of the spear 26 is arrested in the recess 35.

In the manufacture of artificial plugs and lures having construction similar to the present invention it is common practice to split the body into two molded halves and then cement them together again. This procedure is used to make up the carrier 10 and the joint face would lie along the double dot dash line identified as 5—5 in FIG. 4.

Notches in each half are provided for the wire portions 15, 16, 17 for proper alignment when the two half body portions 11, 11 are joined by cementing, thus closing the air pocket 30 and securely fastening the wire shank member 20 to the body 11.

As is clearly seen in FIGS. 1 and 5 the wire shank 20 is rigidly fastened to the body 11 at the pull eye 15 end but is free at the rear keeper 26 end. The spring 17 continually biases the keeper 26 in the hole 34 and the tubular cavity 32, thereby holding anything perforated or gripped by the spear end 26 of the keeper.

To withdraw the spear 26 from the cavity 32 it is only necessary to grasp the finger piece 19 and the body 11 between the forefinger 40 and thumb 45 as seen in FIG. 6A and by squeezing them together as indicated by the arrows the finger piece 19 will move away from the body 11 to thereby withdraw the spear 26 from the cavity 32 as can be seen in FIG. 5 in broken lines or in full lines in FIG. 7A.

This technique allows one hand to manipulate the keeper 26 at the same time the carrier 10 is held by that hand and leaves the other hand free to insert a worm or other bait and then to immediately let the keeper spring into its keep position.

Strange as it might seem, without any training, a night crawler when brought to touch the hole of the cavity 32, will, without hesitation crawl right into it.

As shown in FIGS. 1 and 2 a night crawler 50 is shown as a live bait held by the carrier 10. The carrier when drawn through the water or held in a current will be driven by action of its unbalance i.e. the frontal area of its driver lip 12 and the floatation of its body to wobble, rock and oscilliate about its center of oscillation. This center is located somewhere near the pull eye 15 and along the shank 20.

Since the cavity 32 is located above this oscillation center it will rock to and fro in an arc causing the attached bait to do the same.

As shown in FIG. 1 a trebel hook 29 is attached to the shank 20 and can be used to catch a fish, however, in some instances it will be desirable to detach this hook 29 and use another hooking means or both.

In this same FIG. 1 is also shown a snelled hook 51 having a snell leader 52 and a looped end 53. Here the keeper 26 has passed through the loop 53 and the snell is wrapped around the night crawler 50 and the hook 51 has its point just buried into the crawler. This rigging would be used for conditions where the fish are striking short or nibbling.

Other baits attached to the carrier could have many variations such as their own hooks.

It has been demonstrated that a lure carrier constructed in accordance with the principles described and shown will function according to those objects set forth and while the carrier can be used as an artificial lure by itself, it has the means to be a carrier and driver for an inanimate or dead bait as well as a live bait.

The foregoing description and embodiement of this invention is given by way of illustration and not by limitation. The concept and scope of the invention are limited only by the following claims and equivalents thereof which may occur to others skilled in the art.

What is claimed is:

1. A bait carrier comprising;
   a body having a driver lip, a floatation portion and a tail portion having a bait cavity;
   a spring wire shank member having a laterally disposed anchor bend and pull eye at a first end, a laterally disposed bait keeper at a second end and a finger piece intermediate of the first and second ends;
   wherein said shank member has said anchor bend and pull eye at its first end firmly imbedded in said body above said driver lip and below said floatation portion, about at the center of oscillation, while said finger piece and said keeper at its second end are free for movement but biased toward said body;
   and whereby when said keeper is retracted, a fish bait may be entered into said cavity and retained therein when said keeper is released.

2. A bait carrier as set forth in claim 1;
   wherein said bait cavity is slightly smaller than the outside diameter of the worm to be used as bait.

3. A bait carrier as set forth in claim 1;
   wherein said bait cavity is a thru passage from one wall to another of said tail portion.

4. A bait carrier as set forth in claim 1;
   wherein said keeper is comprised of a spear extending more or less transversely of said cavity through openings provided in said tail portion.

5. A bait carrier as set forth in claim 1;
   wherein said finger piece is comprised of a convolution of said wire shank, whereby squeeze pressure of thumb and finger between the said body and said finger piece causes withdrawal of said keeper from said cavity.

6. A bait carrier as set forth in claim 1;
   wherein said cavity is offset from said center of oscillation.

7. A bait carrier as set forth in claim 1;
   wherein said wire shank at said finger piece carries a hook attaching means;

* * * * *